3,585,168
PROCESS FOR PRODUCING COPOLYMER OF EPOXIDE AND CARBON DIOXIDE
Shohei Inoue, 7–1, 3-chome, Hakusan, Bunkyo-ku; Hideomi Koinuma, 383 Seta-machi, Tamagawa, Setagaya-ku; and Teiji Tsuruta, 36F–203, 4-chome, Kamiyoga, Setagaya-ku, all of Tokyo, Japan
Filed Aug. 15, 1969, Ser. No. 850,472
Claims priority, application Japan, Sept. 21, 1968, 43/67,962
Int. Cl. C08g 17/13
U.S. Cl. 260—77.5D  4 Claims

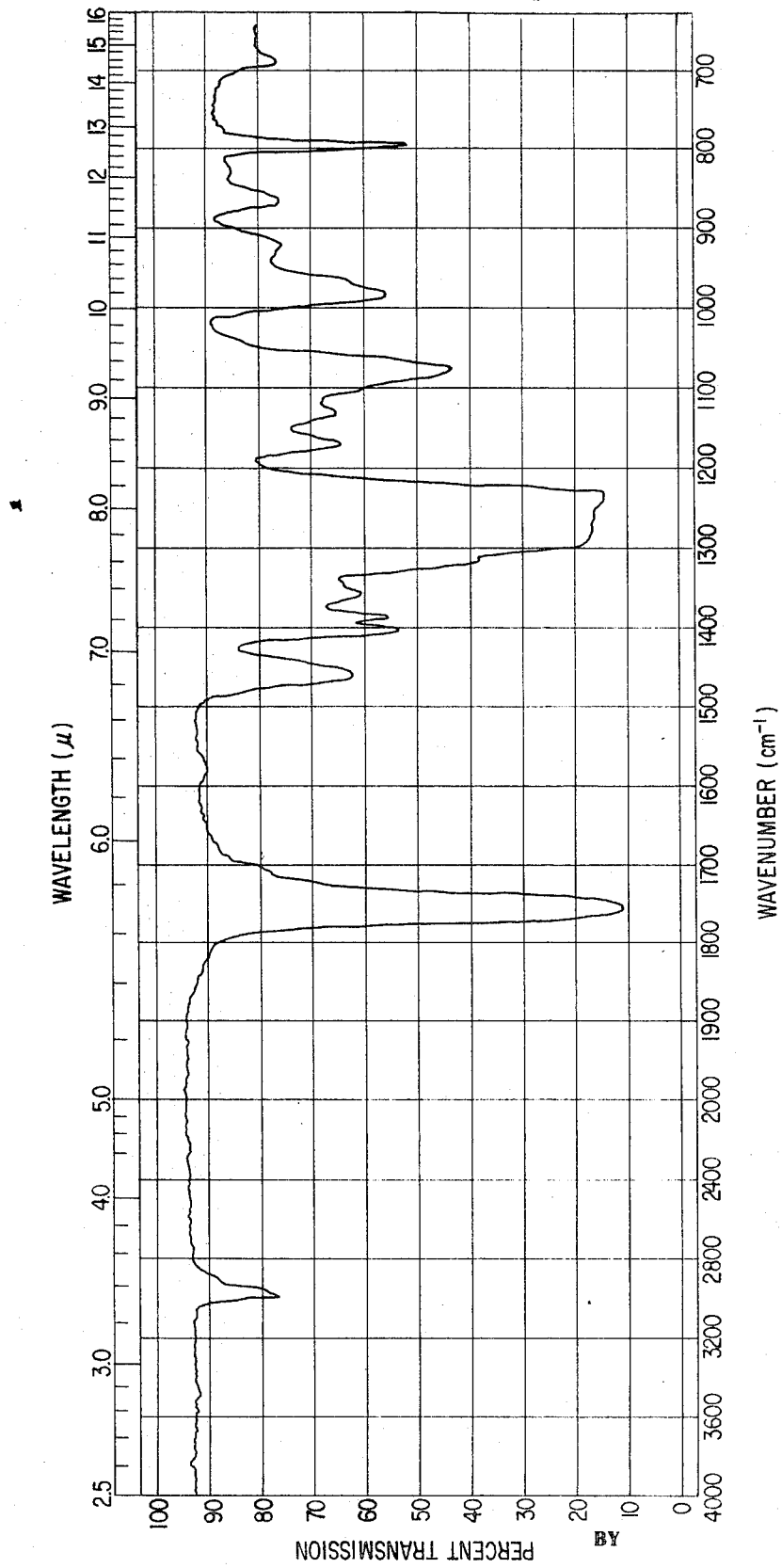

ABSTRACT OF THE DISCLOSURE

A process for producing high molecular weight copolymers of an epoxide, such as propylene oxide, ethylene oxide, styrene oxide, isobutylene oxide or epichlorohydrin, and carbon dioxide, wherein the copolymerization reaction occurs under the pressure of carbon dioxide gas and in the presence of an organometallic compound as a catalyst.

BACKGROUND OF THE INVENTION

It has been known that epoxides can be copolymerized with compounds having hetero double bonds, such as carbon monoxide, sulfur dioxide, or phenyl isocyanoate; however, these prior art products had such a low degree of polymerization that they had very little industrial value. In U.S. Pat. 3,248,415, there is disclosed the concept of producing polycarbonates having molecular weights of from 700 to 5000, and especially 1000 to 1500, and having the general formula:

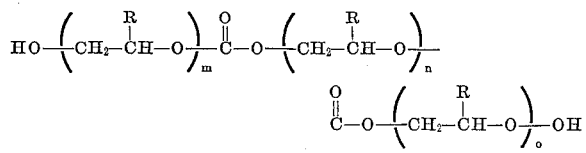

These polycarbonates are produced by reacting carbon dioxide with 1,2-epoxide and with an appropriate amount of an organic compound having at least 2 active hydrogen atoms, without a catalyst, or a base catalyst such as potassium carbonate. The polycarbonates, or, more properly, the poly(ether/carbonates), produced by the known process stated in U.S. Pat. 3,248,415, are produced with one mole of carbon dioxide and 2 to 10 moles of 1,2-epoxides and are characterized by the presence of 2 to 20 and usually 3 to 10 carbonate units

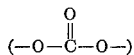

per molecule with the remainder being ether units (—O—). The terminal groups of these polycarbonates both contain active hydrogen atoms such as hydroxyl groups. In U.S. Pat. 3,248,415, it is stated that these polycarbonates could be used for producing alkyd resins, or polyurethane resins by reacting the terminal groups having active hydrogen atoms with a polycarboxylic acid or a diisocyanate. The polycarbonates of that disclosure are light or dark brown colored viscous liquids or waxes which are used as prepolymers for preparing alkyd resins or polyurethane resins. They are not solid polymers which could be used for making articles.

SUMMARY OF THE INVENTION

It is therefore an object of this invention to provide a novel high molecular weight polycarbonate having a substantial proportion of carbonate units. It is another object of this invention to provide a process for producing a high molecular weight copolymer of an epoxide and carbon dioxide and having a substantial proportion of carbonate units or both carbonate units and ether units.

These and other objects have now herein been attained by providing copolymers of epoxide and carbon dioxide by a process wherein an epoxide, such as propylene oxide, ethylene oxide, styrene oxide, isobutylene oxide, or epichlorohydrin, is copolymerized with carbon dioxide under carbon dioxide gas pressure in the presence of an organometallic compound catalyst.

DETAILED DESCRIPTION OF THE INVENTION

The novel high molecular weight polycarbonates of this invention are made of substantially same mole ratio of carbon dioxide and epoxide, and have a substantial proportion of carbonate units of the formula

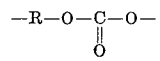

wherein —R— is

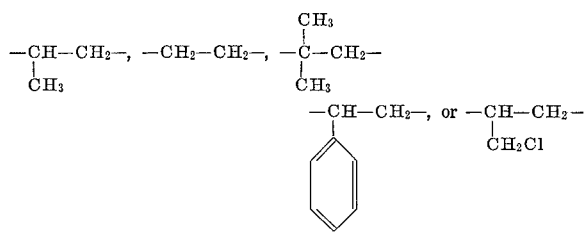

The molecular weight of the polycarbonates of this invention is between 10,000 and 200,000 and usually 20,000 to 50,000. The terminal groups of the polycarbonate of this invention contains hydrogen atoms and residue of the catalyst or cocatalyst used in the reaction. Accordingly, the general formula of polycarbonate of this invention is

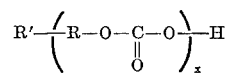

wherein —R— is defined above. $x$ is an integer of between 1,000 and 20,000, R' is an alkyl group, an aralkyl group, an aryl group, halogen, an alkoxy group, an alkyl-amino group, an alkyl-thio group or an hydroxy group.

The novel high molecular weight polycarbonate of this invention is a white solid copolymer having high strength and slight elasticity whose decomposition temperature is at least 180° C. Accordingly, the high molecular weight polycarbonate of this invention is useful as a molding composition and in the formation of fibers and articles having slight elasticity. The novel high molecular weight polycarbonate of this invention is different from those known polycarbonates made by polycondensation of phosgene and diol or bisphenol or made by copolymerization of carbon dioxide, epoxide, and an organic compound having at least two active hydrogen atoms.

In order to obtain the novel high molecular weight polycarbonate of this invention, a novel reaction process is employed in which an epoxide is copolymerized with carbon dioxide under pressure in the presence of an organometallic compound. The process of this invention is also applicable in producing high molecular weight polycarbonate having carbonate units and ether units, whose molecular weight is from 10,000 to 200,000 and which is a white solid characterized by high strength and slight elasticity whose decomposition temperature is at least 180° C. and which is useful for molding resin, fiber and articles of slight elasticity.

The epoxide used for the process of this invention is selected from alkylene oxides, including ethylene oxide, propylene oxide, epichlorohydrin, isobutylene oxide, and styrene oxide. The carbon dioxide may be in the form of a gas, liquid or solid and may be reacted at a pressure which is higher than atmospheric, preferably, between 10 atmospheres to 150 atmospheres, although the process may also be carried out at atmospheric pressure. If the carbon dioxide pressure is too low, the content of carbon dioxide in the copolymer will be decreased, and the copolymer thus formed will have the general formula

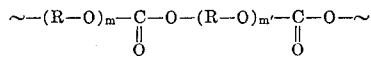

wherein —R— is the same as the above defined and each of $m$ and $m'$ are integers. The reaction temperature of the process of this invention may be from room temperature of the process of this invention many be from room temperature to 150° C. and preferably from 20° C. to 70° C. At lower temperatures, the yield of the copolymers is decreased, whereas at higher temperatures, such as above 100° C., the yield of the copolymer is high enough, but the molecular weight of the copolymer is decreased.

The organometallic compounds used as the polymerization cataylst, may be a compound having the general formula $R'_nM$ wherein $R'$ is an alkyl group, an aralkyl group, or an aryl group or a halogen or alkoxy derivative therof. $n$ is an integer; $R'$ groups, except for one, may also be halogen, alkoxy, alkyl-amino, or alkylthio groups. M is a metal element selected from the group of metal elements included in the Groups I, II, and III of the Periodic Table. Suitable metal elements are zinc (Group II) and aluminum (Group III) and other metal elements such as lithium (Group I), calcium, magnesium and cadmium (Group II) although other metal elements are equally suitable.

The examples of typical organometallic compounds used in the process of this invention, include diethyl-zinc, tetraethyl-zinc-calcium, triethyl-aluminum, n-butyl-lithium, dibutyl-magnesium and diethyl-cadmium.

The quantity of the organometallic compound required for good catalytic action is usually between 0.01 and 10 mole percent, but the exact amount can be selected depending upon other conditions.

A cocatalyst having an active hydrogen atom, such as water, alcohol or ketone, may also be used if desired. The amounts of the cocatalyst when used may be up to twice the molar amount of the organometallic compound, depending upon other conditions.

In the process of this invention, bulk polymerization or solution polymerization, is usually employed. When solution polymerization is used, a solvent such as an aliphatic hydrocarbon, an aromatic hydrocarbon, a halogenated hydrocarbon, or a cyclic ether is used.

By the following experiments, we confirmed that the product made by the process of this invention is the copolymer having carbonate linkages.

EXAMPLE 1

Into a 100 ml. 3-neck flask having a reflux condenser and a gas passage tube is admixed 27 ml. of benzene, 23.2 g. (0.4 mole) of propylene oxide, 0.23 g. (13 mmole) water and 1.85 g. (15 mmole) of diethylzinc. The admixture is then placed under a carbon dioxide atmosphere. Carbon dioxide gas is added over a three hour period while stirring with a magnetic stirrer at room temperature to cause reaction. The mixture in the flask is thereby converted into an opaque gelatinous product. After the reaction, 100 ml. of benzene is added to the product and the benzene solution of the mixture is washed three times with dilute hydrochloric acid and with 50 ml. of water and is freeze-dried to obtain 0.62 g. of opaque grease product. The product is dissolved with a small amount of benzene and added into a large amount of methanol to obtain 0.16 g. of white solid product. The white solid product is recognized to be the copolymer of 56% of propylene oxide and 44% of carbon dioxide having significant alternate structure (polycarbonate), by the elemental analysis and the nuclear magnetic resonance spectrum. In the figure, the infrared spectrum of the copolymer is shown. The infrared spectrum is different from that of the homopolymer of propylene oxide, and has strong absorption peaks at 1745 cm.$^{-1}$ and 1250 cm.$^{-1}$ which are caused by the presence of carbonate linkages. The intrinsic viscosity of this copolymer in benzene at 30° C. is 1.54.

EXAMPLE 2

In 100 ml. of autoclave, 13.5 ml. of benzene, 0.97 g. (8 mmole) of diethyl-zinc, 0.13 g. (7.2 mmole) of water and 11.6 g. (0.2 mole) propylene oxide are placed under a carbon dioxide atmosphere. Carbon dioxide gas is added from the gas cylinder until the pressure is about 60 atmospheres. The presence of carbon dioxide is maintained while stirring the mixture at about 50 to 60 atmospheres and at room temperature to cause reaction for 12 hours. After standing without stirring for an additional 12 hours, the autoclave reactor is opened and the opaque and viscous precipitated product is separated and treated as described in Example 1 to obtain 1.46 grams of the copolymer. The copolymer is dissolved in benzene and added into a large amount of methanol to be precipitated and purified so as to obtain 1.37 g. of white solid product. The infrared spectrum of the product is substantially the same as that shown for the product obtained in Example 1.

It is recognized that the alternate structure of the product is superior to the product in Example 1 by nuclear magnetic resonance spectrum. The result of elementary analysis shows that the ratio of carbon dioxide and propylene oxide for the product is 1:1. The product is substantially completely polycarbonate. The intrinsic viscosity of this copolymer in benzene at 31° C. is 0.51.

EXAMPLE 3

In 100 ml. autoclave, 20 ml. of benzene, 1.37 g. (12 mmole) of triethyl-aluminum, 0.11 g. (6 mmole) of water, 0.16 g. (6 mmole) of acetyl-acetone and 17.4 g. (0.3 mole) propylene oxide are added under a carbon dioxide atmosphere. Where the mixture is reacted for 18 hours in the same manner as Example 2, the stirring is prevented because of the increase of viscosity of the reaction system to produce the transparent viscous product. The product is treated in the same manner as Example 1 to obtain 10.6 g. of white rubber-like material. The infrared spectrum of this rubber-like product shows that the copolymer product has the lower content of carbon dioxide and less alternate structure of carbonate linkages and ether linkages in comparison with the product obtained in Examples 1 or 2, wherein diethyl-zinc is used as a catalyst.

EXAMPLE 4

The reaction of Example 2 is repeated, except 18.5 g. (0.2 mole) epichlorohydrin is used instead of propylene oxide for 8 hours. After standing for 48 hours, the product is treated in the same manner as Example 2, to obtain 0.83 g. of white viscous product. The soluble part of the copolymer product in tetrahydrofuran is added to a large amount of methanol to obtain 0.16 g. of white solid.

EXAMPLES 5-14

Each reaction was made under the conditions stated in the following table, wherein the amount of catalyst is 4 mole percent of epoxide in each case.

| No. | 1,2 epoxide, weight grams (mole) | $CO_2$, atm. | Catalyst | Solvent | Time, hour | Temperature, °C. | Polymer freeze-dried | Weight (grams) methanol insoluble |
|---|---|---|---|---|---|---|---|---|
| 5 | PO 17.3 (0.3) | 50 | Mg (n—Bu)$_2$ | DEE | 21 | 15-25 | 1.40 | 0 |
| 6 | PO 11.6 (0.2) | 50 | CaZnEt$_4$ | B | 67 | 15-25 | 0.12 | Trace |
| 7 | PO 11.6 (0.2) | 50 | n—BuLi | T | 24 | 15-25 | 0.13 | 0 |
| 8 | PO 17.3 (0.3) | 50 | ZnEt$_2$—H$_2$O (1:0.9) | DO | 288 | 15-25 | 5.20 | [1] 5.15 |
| 9 | PO 17.3 (0.3) | 20-50 | ZnEt$_2$—H$_2$O (1:1) | DO | 48 | 80 | 13.36 | [2] 7.14 |
| 10 | PO 17.3 (0.3) | 40 | ZnEt$_3$—H$_2$O (1:1) | DO | 48 | 15-25 | 4.07 | 3.68 |
| 11 | PO 17.3 (0.3) | 50 | AlEt$_3$ | B | 28 | 15-25 | 9.16 | Trace |
| 12 | STO 24.0 (0.2) | 50 | ZnEt$_2$—H$_2$O (1:0.9) | B | 24 | 15-25 |  | 0.51 |
| 13 | EO 14.2 (0.3) | 25 | ZnEt$_2$—H$_2$O (1:0.9) | DO | 113 | 15-25 | 2.79 | [3] 1.10 |
| 14 | IBO 4.3 (0.06) | 45 | ZnEt$_2$—H$_2$O (1:0.9) | DO | 240 | 15-25 | 0.20 | 0.06 |
| 15 | PO 34.5 (0.4) | 40 | ZnEt$_2$—H$_2$O (1:1) | None | 78 | 15-25 | 3.81 | 2.82 |

[1] $(\eta)$=1.35 (in benzene 30° C.) 4.60 (in chloroform 30° C.).
[2] $(\eta)$=0.24 (in benzene 30° C.).
[3] $(\eta)$=0.98 (in chloroform 30° C.).

NOTE.—PO=propylene oxide; STO=styrene oxide; EO=ethylene oxide; IBO=isobutylene oxide; DEE=diethylether; B=benzene; T=toluene; DO=dioxane.

It will be understood that the invention is not to be limited to the examples, but that various modifications may be made without departing from the spirit and scope of the invention as defined in the claims.

What we claim and desire to be covered by Letters Patent of the United States is:

1. A process for producing a polycarbonate having carbonate linkages and ether linkages which is characterized by copolymerizing an epoxide selected from the group consisting of propylene oxide, ethylene oxide, styrene oxide, isobutylene oxide, and epichlorohydrin, with carbon dioxide in the presence of an organo-metallic catalyst having the general formula: R'$n$M, wherein $n$ is an integer and wherein at least one R' is selected from the group consisting of an alkyl group, an aralkyl group, an aryl group and halogen, hydroxy and alkoxy derivatives thereof, and the remaining R' groups may be selected from the group consisting of alkyl groups, aralkyl groups, aryl groups, and halogen, alkoxy and hydroxy derivatives thereof, alkylthio groups, halogen atoms and alkoxy groups and wherein M is a metal element selected from the group consisting of those metal elements in Groups I, II, and III of the Periodic Table, and wherein the copolymerization occurs under pressure of between 10 and 150 atmospheres and at a temperature of between room temperature and 150° C.

2. The process of claim 1, wherein said organometallic catalyst is present in a catalytic amount of from between 0.01 to 10 mole percent.

3. The process of claim 1, wherein said organometallic catalyst is selected from the group consisting of diethylzinc, tetraethyl-zinc, calcium, triethyl aluminum, n-butyl-lithium, dibutyl magnesium, and diethyl cadmium.

4. A process for producing a polycarbonate having carbonate linkages which is characterized by copolymerizing an epoxide selected from the group consisting of propylene oxide, ethylene oxide, styrene oxide, isobutylene oxide, and epichlorohydrin, with carbon dioxide at from 10 to 150 atmospheres of pressure thereof and at a temperature of between room temperature and 150° C. in the presence of a solvent and an organo-metallic catalyst selected from zinc or aluminum compounds having an alkyl, an aralkyl, or an aryl group.

References Cited

UNITED STATES PATENTS

| | | | |
|---|---|---|---|
| 2,997,459 | 8/1961 | Schnell et al. | 260—77.5 |
| 3,012,990 | 12/1961 | Kray et al. | 260—77.5 |
| 3,227,740 | 1/1966 | Fenton | 260—77.5 |
| 3,248,415 | 4/1966 | Stevens | 260—77.5 |
| 3,313,782 | 4/1967 | Springmann et al. | 260—77.5 |

FOREIGN PATENTS

| | | | |
|---|---|---|---|
| 719,295 | 10/1965 | Canada | 260—77.5 |
| 1,045,211 | 10/1966 | Great Britain | 260—77.5 |

SAMUEL H. BLECH, Primary Examiner